Patented Aug. 3, 1943

2,325,681

UNITED STATES PATENT OFFICE 2,325,681

PROCESS FOR PRODUCING CONDENSATION PRODUCTS OF 1,4-NAPHTHOHYDROQUINONES

Otto Isler, Basel, Switzerland, assignor to Hoffmann-La Roche Inc., Nutley, N. J., a corporation of New Jersey No Drawing. Application August 12, 1940, Serial No. 352,336. In Switzerland August 31, 1939

1 Claim. (Cl. 260—479)

It is known that 2-methyl naphthohydroquinone condenses with phytol or phytyl bromide to form 2-methyl-3-phytyl-naphthohydroquinone (dihydro-vitamin K).

It has now been found that new condensation products are formed when napthohydroquinones, having a free position in the hydroquinone ring, are condensed with acetyl-phytol. These condensation products are mono-acetyl-$\beta$-phytyl-1,4-hydroquinones and on hydrolysis $\beta$-phytyl-1,4-hydroquinones are formed which can be oxidised by mild oxidising agents to $\beta$-phytyl-1,4-naphthoquinones.

The new compounds obtained in accordance with the present invention are viscous oils which reduce ammoniacal silver nitrate in alcoholic solution. The condensation products are nearly colorless and very easily soluble in petroleum ether, chloroform, ether, and benzene. With cyanacetic ester and alcoholic ammonia they show no blue coloration. The oxidation products are reddish in color and give a blue color with sodium ethylate.

The condensation products and their oxidation products show the effects of vitamin K in physiological tests. They are to be used for the manufacture of medicinal preparations and as intermediate products for obtaining further pharmaceutically active compounds.

Example 2 parts by weight of 2-methyl-naphthohydroquinone in 5 parts by weight of benzene and 1 part by weight of anhydrous zinc chloride in 10 parts by weight of dry ether are stirred at 40° C. in a stream of carbon dioxide. In the course of 2 hours 4 parts by weight of acetyl-phytol in 6 parts by weight of benzene are added drop by drop. The reaction solution is heated another 6 hours and the solvent then evaporated in vacuo. The residue is dissolved out with petroleum ether of boiling point 40–70° C. and the petroleum ether extracts filtered through a small magnesium sulphate column for the purpose of removing by-products, whereby the column is washed with a large quantity of petroleum ether. The filtrates are washed with water, dried, concentrated and the extract fractionated in a molecular distilling apparatus. Non-condensed acetyl-phytol and a little 2-methylnaphthoquinone distil at below 115° C. The required condensation product evaporates at between 120 and 130° C. It is nearly colorless, viscous oil, which possesses vitmain K activity and which has the following formula:

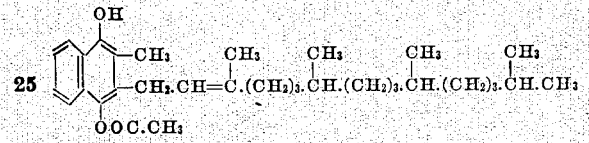

I claim:

Process for the manufacture of a condensation product, comprising condensing 2-methyl-1,4-napthohydroquinone with acetyl-phytol in presence of an acid condensing agent.

OTTO ISLER.